(12) United States Patent
Takahashi et al.

(10) Patent No.: US 7,363,103 B2
(45) Date of Patent: Apr. 22, 2008

(54) METHOD AND APPARATUS FOR GENERATING MACHINING INFORMATION, AND COMPUTER PRODUCT

(75) Inventors: Hiroshi Takahashi, Kawasaki (JP);
Shingo Yamaguchi, Kawasaki (JP);
Satoshi Kanbayashi, Kawasaki (JP);
Mitsugu Suzuki, Atsugi (JP);
Yoshiyuki Haruta, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/384,338

(22) Filed: Mar. 21, 2006

(65) Prior Publication Data
US 2006/0161290 A1    Jul. 20, 2006

Related U.S. Application Data

(63) Continuation of application No. PCT/JP2004/015800, filed on Oct. 25, 2004.

(30) Foreign Application Priority Data
Oct. 23, 2003  (JP)  ............... 2003-363633

(51) Int. Cl.
G06F 19/00 (2006.01)
(52) U.S. Cl. .................. 700/182; 700/173; 700/175
(58) Field of Classification Search ................ 700/173, 700/175, 182
See application file for complete search history.

(56) References Cited

U.S. PATENT DOCUMENTS

| | | | | |
|---|---|---|---|---|
| 5,377,116 A | * | 12/1994 | Wayne et al. ............... | 700/175 |
| 5,561,601 A | * | 10/1996 | Inoue et al. ................ | 700/182 |
| 5,691,909 A | * | 11/1997 | Frey et al. .................. | 700/159 |
| 5,801,963 A | * | 9/1998 | Sadler et al. ................ | 702/34 |
| 6,438,445 B1 | * | 8/2002 | Yoshida et al. ............. | 700/173 |
| 2003/0130758 A1 | | 7/2003 | Hirano et al. | |
| 2003/0171842 A1 | * | 9/2003 | Teramoto et al. ........... | 700/182 |

FOREIGN PATENT DOCUMENTS

| | | |
|---|---|---|
| EP | 1 065 029 | 1/2001 |
| EP | 1 217 482 | 6/2002 |
| JP | 06-119031 | 4/1994 |
| JP | 06-332515 | 12/1994 |
| JP | 09-050311 | 2/1997 |
| JP | 11-99445 | 4/1999 |
| JP | 11-175122 | 7/1999 |
| JP | 2966672 | 8/1999 |
| JP | 2002-14711 | 1/2002 |
| JP | 2003-177811 | 6/2003 |

OTHER PUBLICATIONS

T. Lim, et al., "Optimizing Tool Selection," *International Journal of Production Research*, vol. 39, No. 6 (Apr. 15, 2001).
Y.S. Lee, et al., "Feature-Composition Approach to Planning and Machining of Generic Virtual Pockets," *Computers in Industry*, vol. 13, No. 2 (Nov. 1, 1996).
Office Action mailed Mar. 23, 2007 in Korean patent application No. 2006-7006668.

* cited by examiner

*Primary Examiner*—Michael D. Masinick
(74) *Attorney, Agent, or Firm*—Staas & Halsey LLP

(57) ABSTRACT

A machining information generating apparatus includes shape analyzing unit that obtains CAD data, searches a shape database of machining profile information for necessary information based on the CAD data, and performs a shape analysis, thereby creating an equation model for an uncut amount along an intended machining profile based on an uncut amount result from a simulation of a tool and data about the machining profile.

20 Claims, 19 Drawing Sheets

BALL END MILL

FLAT END MILL

R END MILL

SPECIAL SHAPE

FIG.17

| SHAPE ID | NAME | EQUATION |
|---|---|---|
| 1 | CROSS-SECTIONAL SHAPE A | $0.215 \times a1 \times r^2$ |
| 2 | CROSS-SECTIONAL SHAPE B | $0.19 \times a1 \times r^2$ |
| 3 | CROSS-SECTIONAL SHAPE C | $0.18 \times a1 \times r^2$ |
| 4 | CROSS-SECTIONAL SHAPE D | $0.15 \times a1 \times r^2$ |
| 5 | CROSS-SECTIONAL SHAPE E | $0.21 \times a1 \times r^2 + 0.15 \times a2 \times r + 0.6 \times a3$ |
| 6 | CROSS-SECTIONAL SHAPE F | $0.55 \times a1 \times r^2 + 0.5 \times r + 0.8 \times a3$ |
| ⋮ | ⋮ | ⋮ |

FIG.18

| MACHINING EXAMPLE ID | NAME | EQUATION | APPLICABLE TOOL | MACHINING TIME |
|---|---|---|---|---|
| 1 | MOLD A | 120×r^2+200×r+50 | 1+3+5 | 1200 |
| 2 | MOLD B | 300×r^2+30 | 1+2+3 | 400 |
| 3 | MOLD C | 1400×r^2+4000×r+50 | 3+5+8 | 11500 |
| 4 | MOLD D | 5500×r^2+120 | 5+8+9 | 25000 |
| 5 | MOLD E | 2200×r^2+100 | 4+6+8 | 12000 |
| 6 | MOLD F | 1500×r^2+500×r+350 | 2+4+6 | 6000 |
| ... | ... | ... | ... | ... |

FIG.19

| TOOL ID | NAME | TOOL DIAMETER | CUTTING EDGE LENGTH | TOTAL LENGTH | HANDLE DIAMETER |
|---|---|---|---|---|---|
| 1 | BEM1 | 1 | 10 | 50 | 4 |
| 2 | BEM2 | 2 | 10 | 50 | 4 |
| 3 | BEM3 | 3 | 20 | 60 | 4 |
| 4 | BEM4 | 4 | 20 | 70 | 4 |
| 5 | BEM5 | 5 | 30 | 80 | 6 |
| 6 | BEM6 | 6 | 30 | 90 | 6 |
| ... | ... | ... | ... | ... | ... |

METHOD AND APPARATUS FOR GENERATING MACHINING INFORMATION, AND COMPUTER PRODUCT

This application is a continuing application, filed under 35 U.S.C. §111(a), of International Application PCT/JP2004/015800, filed Oct. 25, 2004, it being further noted that foreign priority benefit is based upon Japanese Patent Application 2003-363633, filed Oct. 23, 2003.

BACKGROUND OF THE INVENTION

1. Field of the Invention

The present invention relates to a technology that assists generation of machining information for a determination of a necessary tool etc. when a tool path for machining is created in a computer-aided manufacturing (CAM) system from computer-aided design (CAD) workpiece data generated in a CAD system.

The CAD system refers to a computer-based drafting and design support system, and the CAM system refers to an automatic production system or a manufacturing support system based on CAD-generated designs.

2. Description of the Related Art (1): Conventionally, an operator determines which tool to use to cut a mold etc. Before starting machining, the operator can perform a computer-based verification by creating a tool path for an intended workpiece from the shape characteristics of the tool, cutting conditions, etc. and then by simulating the path. However, to select a different tool based on the verification result to, for example, shorten a machining time even further, the operator must exert their skill or intuition, make a comparison with the past results etc., or make several trial-and-error attempts.

Computers have advanced and become increasingly faster, allowing a reduction of the machining time through a simulation of several trial-and-error attempts, which, however, still require an operator intervention. If a computer is used to make trial-and-error attempts automatically to assist in a tool determination, a database of information about all possessed tools, holders, machines, etc. is constructed and the trial-and-error attempts are made for all tools, thereby determining a combination of tools that offers the shortest machining time. However, a simulation must be performed for all tools, involving a vast quantity of calculations.

(2): During a machining database construction, the shape characteristics etc. of a workpiece, including "outer dimensions," "volume," "pocket," and "hole," are used as keys. The shape characteristics such as "outer dimensions" and "volume" can be computed with relative ease, but are insufficiently informative as keys for machining characteristics. For the shape characteristics such as "pocket" and "hole" that largely affect machining, it is very difficult to make definitions' from which the shapes are extracted in a computing process.

As a solution to this problem, workpiece categories such as "product name" and "part name" or workpiece shape characteristics such as "pocket" and "hole" are manually added to machining profile data to assist in a computing process. In this case, the computer does not provide a fully automatic machining assistance, and personnel familiar with their own system and machining must construct a machining database.

(3): Explanation of other examples of the conventional technology

Other examples of the conventional technology are disclosed in, for example, patent documents 1 to 5 listed below. The patent documents are found as a result of a document search performed in consideration of relevance to the following topic: "create basic model curves of tool diameter vs. uncut amount for a basic machining profile model, record the curves to a database in advance, select from the database a tool diameter corresponding to a current shape to be machined, perform a cutting simulation, and select a larger- or smaller-diameter tool for use in the next sequence according to where an uncut portion is positioned with respect to a corresponding basic model curve." The disclosures in the documents are explained below as examples of the conventional technology.

A: Patent Document 1

The document provides an example of an NC data generating method for corner portions by which a process is performed to determine an optimum machining tool for each corner portion based on a calculated uncut amount in the portion, and the process is repeated until all uncut amounts fall within tolerance limits.

B: Patent Document 2

The document provides an example of an NC data generating method for machining uncut portions by which in each machining sequence, tool path data is calculated and a cutting simulation is performed to obtain uncut amount information, which is then transferred to the next cutting sequence for tool path calculation. Thus tool path data is generated in every machining sequence.

C: Patent Document 3

The document provides an example of a machining data generating system in which a tool with the largest diameter that can be inserted into a specified machining area is selected, an uncut amount in the area is calculated, and the calculated information is used to select the next necessary tool from a database.

D: Patent Document 4

The document provides an example of a numerical controller that finds a combination of tools that enables machining in the shortest time, from a tool database that contains entries of tools for which machining times are obtained through machining simulations.

E: Patent Document 5

The document provides an example of a numerical control data generating method by which if a ratio of a machinable area to a selected tool is small, another tool with the next smaller diameter is selected, and if a machining area has a closed shape, a tool with a shape that prevents an uncut portion from being left is selected.

Patent document 1: Japanese Patent Application-Laid-Open No. 2966672 (H06-179150)

Patent document 2: Japanese Patent Application-Laid-Open No. H06-119031

Patent document 3: Japanese Patent Application-Laid-Open No. H06-332515

Patent document 4: Japanese Patent Application-Laid-Open No. H09-50311

Patent document 5: Japanese Patent Application-Laid-Open No. H11-175122 a) According to (1) in the conventional technology, an operator intervention is required. If a computer is used to make trial-and-error attempts automatically to assist in a tool determination, a database of information about all possessed tools, holders, machines, etc. is constructed and the trial-and-error attempts are made for all tools, thereby determining a combination of tools that offers the shortest machining time. However, a simulation must be performed for all tools, involving a vast quantity of calculations.

b) According to (2) in the conventional technology, for the shape characteristics such as "pocket" and "hole" that largely affect machining, it is very difficult to make definitions from which the shapes are extracted in a computing process.

As a solution to this problem, workpiece categories such as "product name" and "part name" or workpiece shape characteristics such as "pocket" and "hole" are manually added to machining profile data to assist in a computing process. In this case, the computer does not provide a fully automatic machining assistance, and personnel familiar with their own system and machining must construct a machining database.

c) According to (3) in the conventional technology, all documents found as a result of the search provide only technological background information or reference information for the present invention. A plurality of known examples is found regarding the following topic: "first perform cutting with a larger-diameter tool, and then select a smaller-diameter tool depending on the status of an uncut portion." However, there are no hits in a search for documents that provide technological information similar to that in the present invention and cover the following topic: "compare a cutting simulation result with a basic model curve to select a diameter for the next tool."

The present invention is devised to solve the problems in the conventional technology, with an object of providing absolute evaluation criteria for a given workpiece that do not include shapes or product names. It is another object of the present invention to provide a computer-based assistance easily in a tool selection or a categorization of workpieces by machining characteristics, without having to cause a computer to perform a vast quantity of calculations, when a system is constructed based on the evaluation criteria.

SUMMARY OF THE INVENTION

It is an object of the present invention to at least solve the problems in the conventional technology.

According to an aspect of the present invention, a machining information generating apparatus for generating machining information for a determination of a necessary tool when a tool path for machining is created in a computer aided manufacturing (CAM) system from CAD data relating to workpiece generated in a computer aided design (CAD) system, includes a shape analyzing unit that obtains the CAD data, searches a shape database of machining profile information for necessary information based on the CAD data, and performs a shape analysis, thereby creating an equation model for an uncut amount along an intended machining profile based on an uncut amount result from a simulation of a tool and data about the machining profile.

According to another aspect of the present invention, a machining information generating method for generating machining information for a determination of a necessary tool when a tool path for machining is created in a computer aided manufacturing (CAM) system from CAD data design (CAD) system comprising obtaining the CAD data; searching a shape database for necessary information based on the CAD data; and performing a shape analysis, thereby creating an equation model for an uncut amount along an intended machining profile based on an uncut amount result from a simulation of a tool and data about the machining profile.

According to still another aspect of the present invention, a computer-readable recording medium stores therein a computer program that causes a machining information generating apparatus to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a schematic for illustrating a sample shape database according to the embodiment;

FIG. 18 is a schematic for illustrating a sample machining example database according to the embodiment;

FIG. 19 is a schematic for illustrating a sample tool database according to the embodiment.

DETAILED DESCRIPTION OF THE PREFERRED EMBODIMENTS

Figure 1:
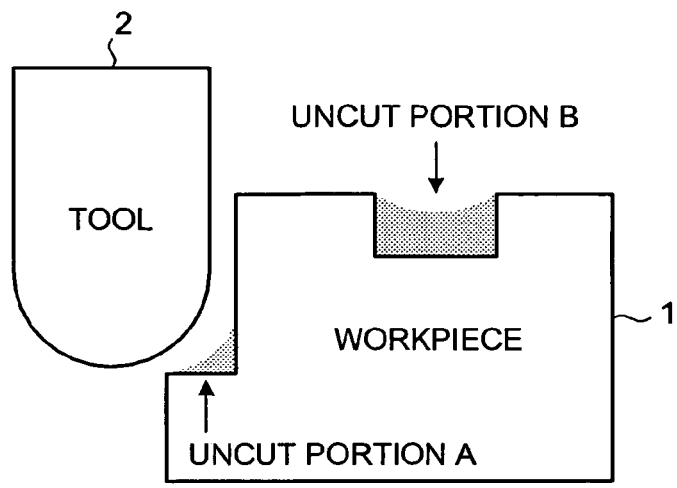
FIG. 1 is a schematic for explaining basic concepts of an embodiment of the present invention.
Figure 2A:
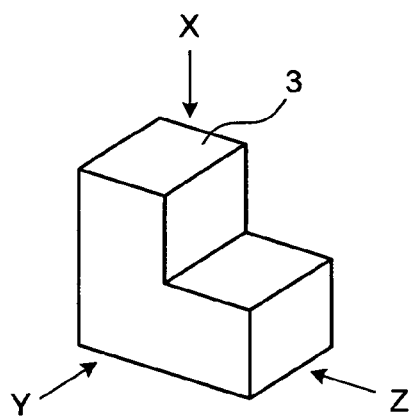
FIG. 2A to FIG. 2D are other diagrams for explaining the basic concepts of the embodiment.
Figure 2B:
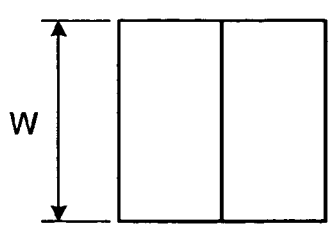
Figure 2C:
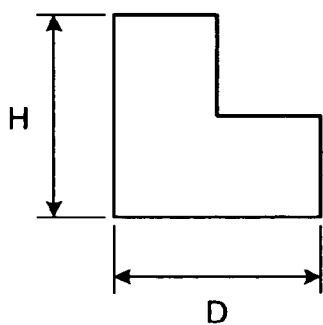
Figure 2D:
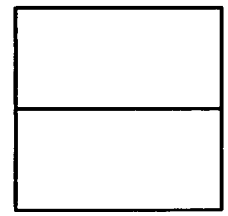
Figure 3A:
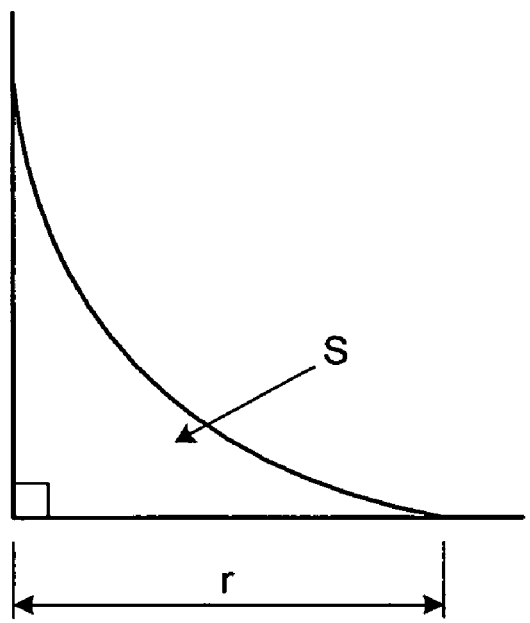
FIG. 3A and FIG. 3B are still other diagrams for explaining the basic concepts of the embodiment.
Figure 3B:
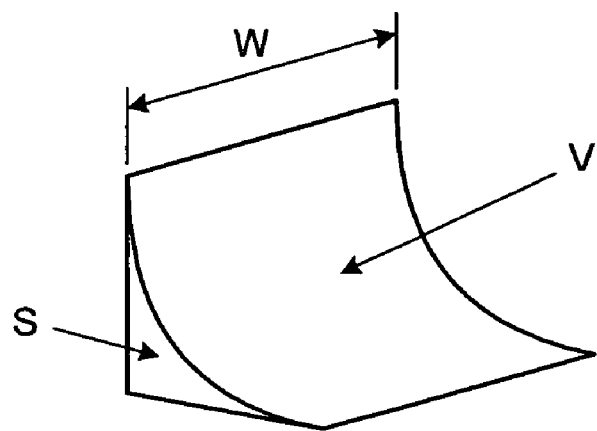

§1: Explanation of Basic Concepts for Processing Etc. in the Machining Information Generating Apparatus FIG. 1 is a diagram for explaining basic concepts. FIG. 2A to FIG. 2D are other diagrams for explaining the basic concepts. FIG. 3A and FIG. 3B are still other diagrams for explaining the basic concepts. The basic concepts for processing etc. in the machining information generating apparatus are explained below with reference to FIG. 1 to FIG. 3B.

According to the present invention, when a specific tool is used for a given workpiece, the volume of an uncut portion is regarded as a characteristic of the workpiece. For example, a workpiece 1 and a tool 2 for cutting the workpiece 1 are provided as shown in FIG. 1. When the workpiece 1 is cut with the tool 2 to form an L shape, an uncut portion A is left with a profile made along the tip shape of the tool 2.

When the tool 2 is used to form a groove, if the tool diameter is smaller than the width of the possible groove shape, an uncut portion is left with a profile made along the tip shape of the tool 2 as in the case of the uncut portion A; and if the tool diameter is larger than the width of the groove, an uncut portion B is left as shown in FIG. 1. Uncut portions fall into two broad types: one type, such as the uncut portion A, is left with a profile made along the tip shape of the tool, and the other type, such as the uncut portion B, is left because the tool cannot be inserted completely. The characteristics of uncut portions are regarded as machining characteristics, which are then used as criteria for a tool selection, a workpiece categorization, etc.

For example, when an L-shaped block 3 as shown in FIG. 2 is used as a basic model and a ball end mill with a radius of r is used, the cross-sectional area of an uncut portion is as follows. FIG. 2A is a perspective view of the L-shaped block 3. When viewed from the X direction, the L-shaped block 3 is as shown in FIG. 2B. When viewed from the Y direction, the L-shaped block 3 is as shown in FIG. 2C. When viewed from the Z direction, the L-shaped block 3 is as shown in FIG. 2D. The L-shaped block 3 has dimensions of a width (W), a height (H), and a depth (D) as shown in the figures.

Given the dimensions, the cross-sectional area S of the uncut portion is obtained as shown in FIG. 3A, by using the equation $S=(1-\pi/4)r^2$. The volume V of the uncut portion is obtained as shown in FIG. 3B, by using the equation $V=(1-\pi/4)r^2W$.

With the model equations, an identification analysis is performed on a machining profile to determine a model-specific width (W), thereby obtaining a relational expression (equation) for the machining profile and a tool from a criterion of an uncut amount. The relational expression can be used to estimate an uncut amount for a tool that precedes or follows the currently selected tool and to construct a machining database in which workpieces are to be categorized.

§2: Explanation of Tool Selections

Figure 4A:
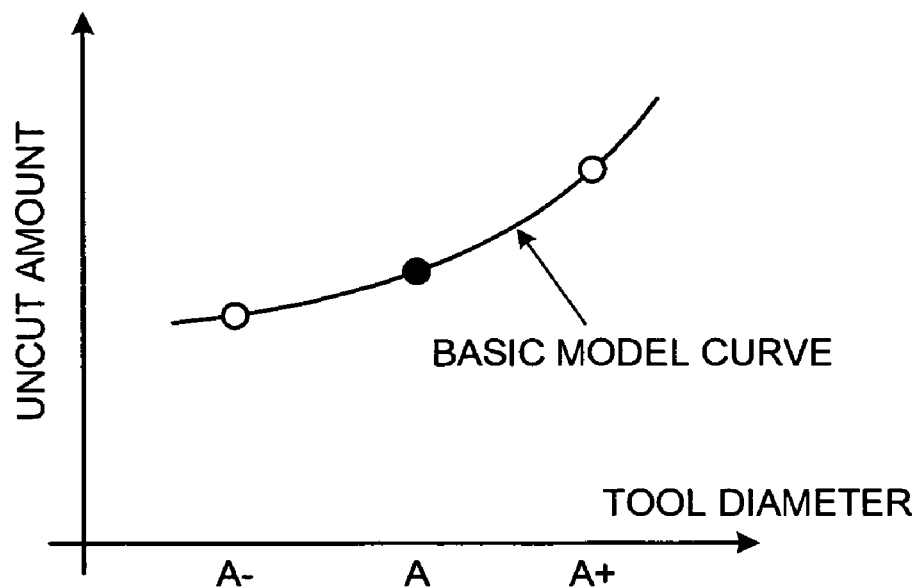
FIG. 4A and FIG. 4B are diagrams for explaining a tool selection according to the embodiment.
Figure 4B:
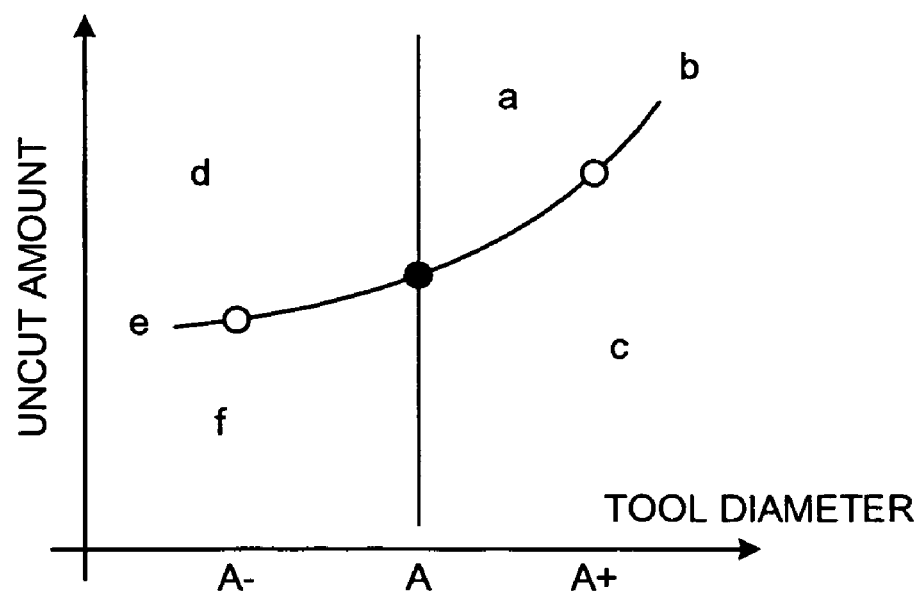
Figure 5:
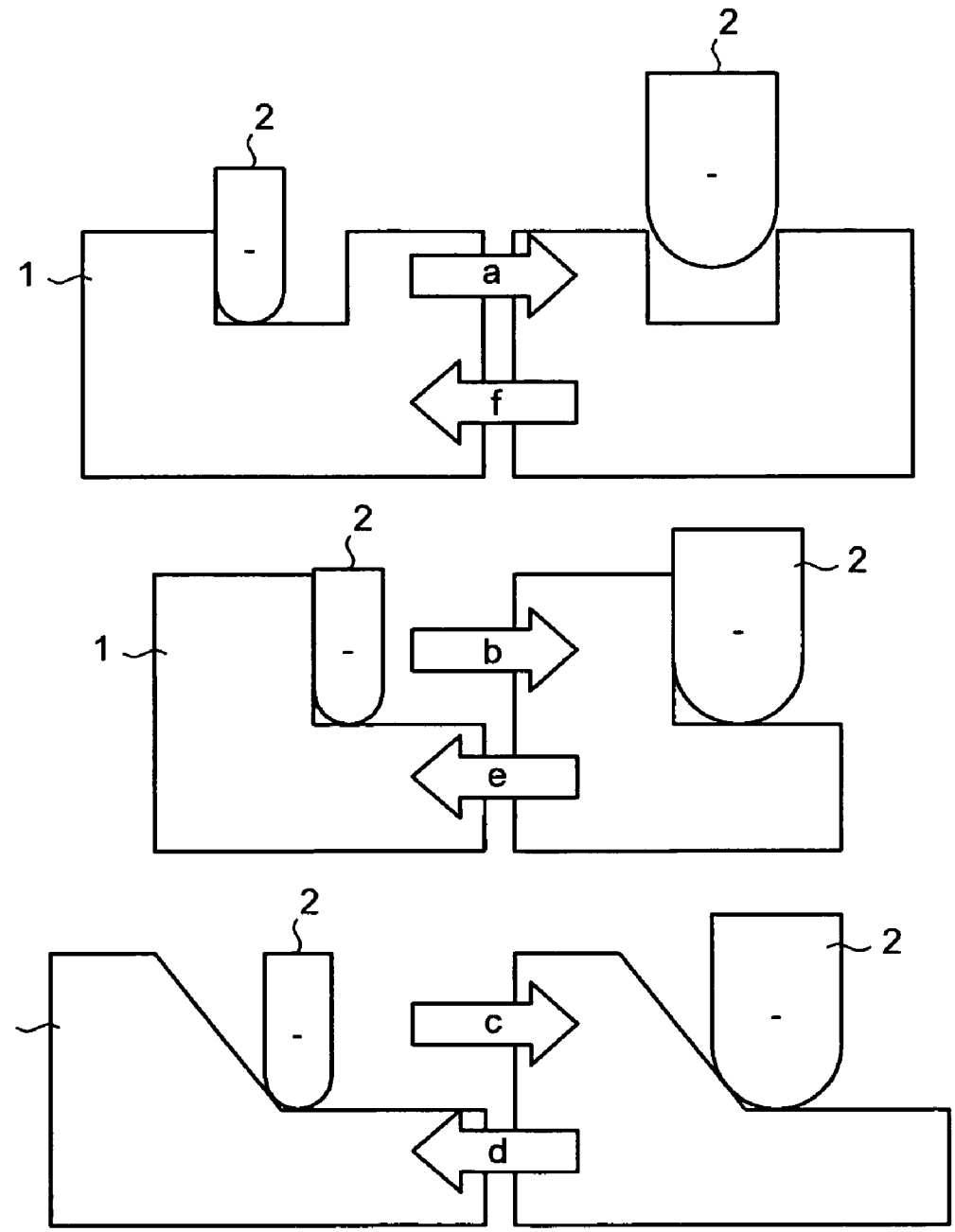
FIG. 5 is another diagram for explaining the tool selection according to the embodiment.

FIG. 4A and FIG. 4B are diagrams for explaining a tool selection. FIG. 5 is another diagram for explaining the tool selection. How to select a tool is explained below with reference to FIG. 4A to FIG. 5. With an L shape used as a basic model in an example provided below, a tool is selected based on a comparison between the characteristics of the basic model and an actual uncut amount. In FIG. 4A and FIG. 4B, the vertical axis is the uncut amount, while the horizontal axis is the tool diameter. On the horizontal axis, A indicates the diameter of a tool to be compared (current tool), A+ indicates a larger diameter c: Even when the tool diameter becomes larger, the uncut amount along the machining profile increases at a lower rate than that in the basic model.→The machining profile is often a shape more open than the basic model.

d: Even when the tool diameter becomes smaller, the uncut amount along the machining profile decreases at a lower rate than that in the basic model.→The machining profile is often a shape more open than the basic model.

e: The uncut amount along the machining profile and the uncut amount in the basic model decrease at the same rate.→The machining profile matches the basic profile.

f: When the tool diameter becomes smaller, the uncut amount along the machining profile decreases at a higher rate than that in the basic model.→The tool can now be inserted into a pocket of the type for which machining has been impossible.

Based on the above classifications, tool selection criteria as shown in the bottom of FIG. 5 are created to provide a compute-based assistance in the tool selections. The process so far is repeated to allow selections of optimum tools without having to perform a simulation for all tools.

§3: Explanation of Database Constructions

Figure 6A:
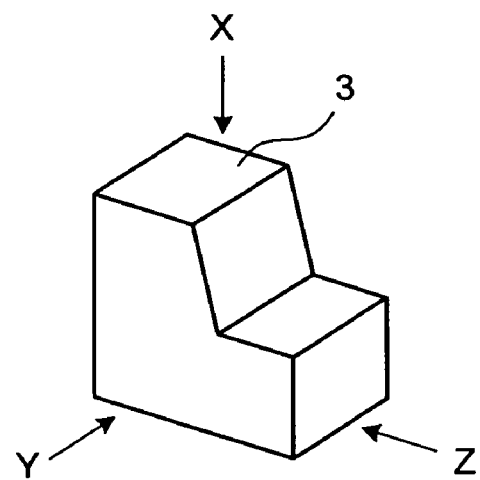
FIG. 6A to FIG. 6D are diagrams for explaining a database construction according to the embodiment.
Figure 6B:
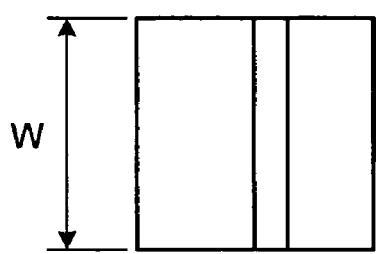
Figure 6C:
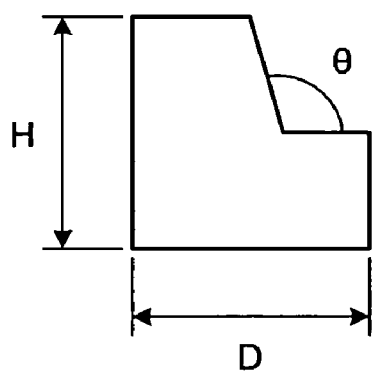
Figure 6D:
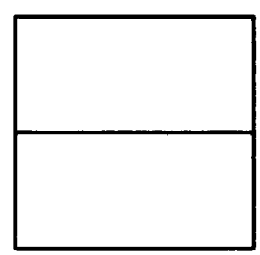
Figure 7A:
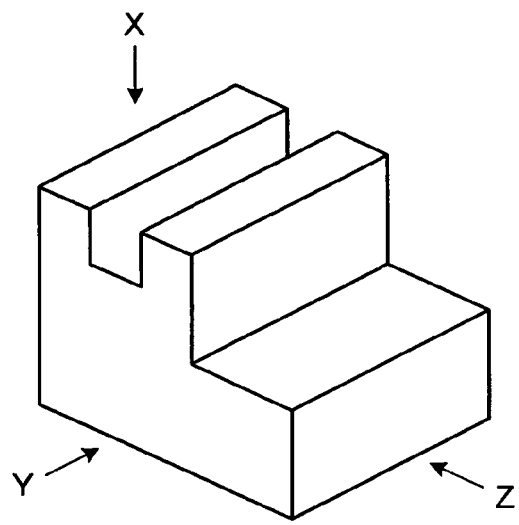
FIG. 7A to FIG. 7C are other diagrams for explaining the database construction according to the embodiment.
Figure 7B:
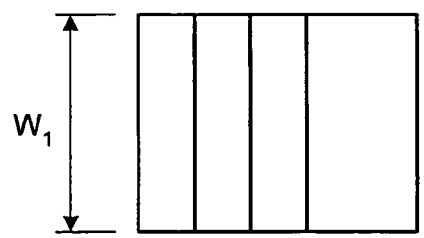
Figure 7C:
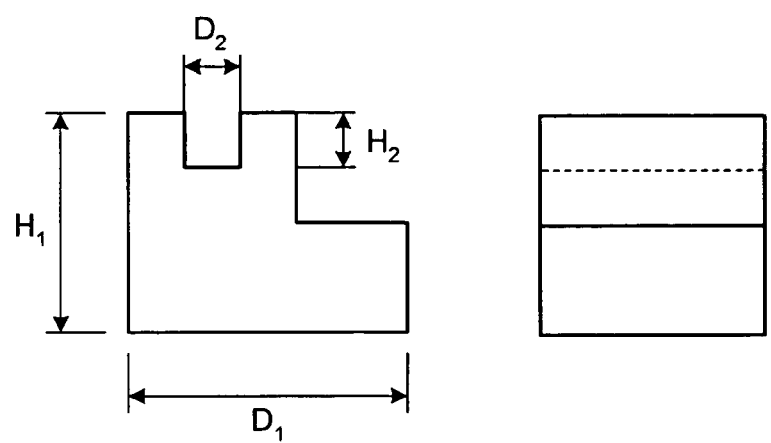

FIG. 6A to FIG. 6D are diagrams for explaining a database construction. FIG. 7A to FIG. 7C are other diagrams for explaining the database construction. FIG. 6A and FIG. 7A are perspective views of the L-shaped block 3. When viewed from the X direction, the L-shaped block 3 is as shown in FIG. 6B and FIG. 7B. When viewed from the Y direction, the L-shaped block 3 is as shown in FIG. 6C and FIG. 7C. When viewed from the Z direction, the L-shaped block 3 is as shown in FIG. 6D and FIG. 7C. The L-shaped block 3 has dimensions of a width (W), a height (H), a depth (D), and a angle of inclination (θ) as shown in the figures. How to construct a database is explained below with reference to FIG. 6A to FIG. 7C.

A higher reliability of an equation model (mathematical model) is assured by making the basic model as close as possible to an actual machining profile. A database is constructed in which the degree and constants of the equation model are handled as shape characteristics for machining. To make uncut amounts resulting from the basic model as close as possible to those in an actual model, the basic model must be complicated.

For example, if a draft is needed as in a mold, an accuracy of a calculation is improved by matching the angle in the L model with the draft as shown in FIG. 6A to FIG. 6D. The volume V of an uncut portion is then as follows.

$$v = \left( \frac{1}{\tan\frac{\theta}{2}} - \frac{\pi - \theta}{2} \right) r^2 W$$

The use of this equation causes the basic model equation to take the draft into account, making the model closer to the actual machining profile.

An uncut portion is not always left with a profile made along a tool tip shape. If a tool used has a diameter larger than a groove width D2 as shown in FIG. 7C, a still larger uncut portion is left because the tool cannot be inserted completely into a possible groove. The uncut amount is then as follows.

$$v = D_2 H_2 W_1 - \left( \frac{r^2}{2} \sin^{-1} \frac{\pi}{2r} - r\sqrt{r^2 - \frac{x^2}{4}} \right) W_1 + \left(1 - \frac{\pi}{4}\right) r^2 W_1$$

This enables parameterization of the length of the L portion and the width, depth, and length of the groove. An accuracy of an estimation of uncut amounts is thus improved by complicating the basic model.

Through applications of this method, a machining database is constructed with the degree and constants of the equation model (mathematical model) identified by making the basic model closer to the actual machining profile. This enables machining profiles to be categorized according to certain criteria without having to define pockets and groves or to register product shapes.

§4: Explanation of Cross-Sectional Shapes

Figure 8:
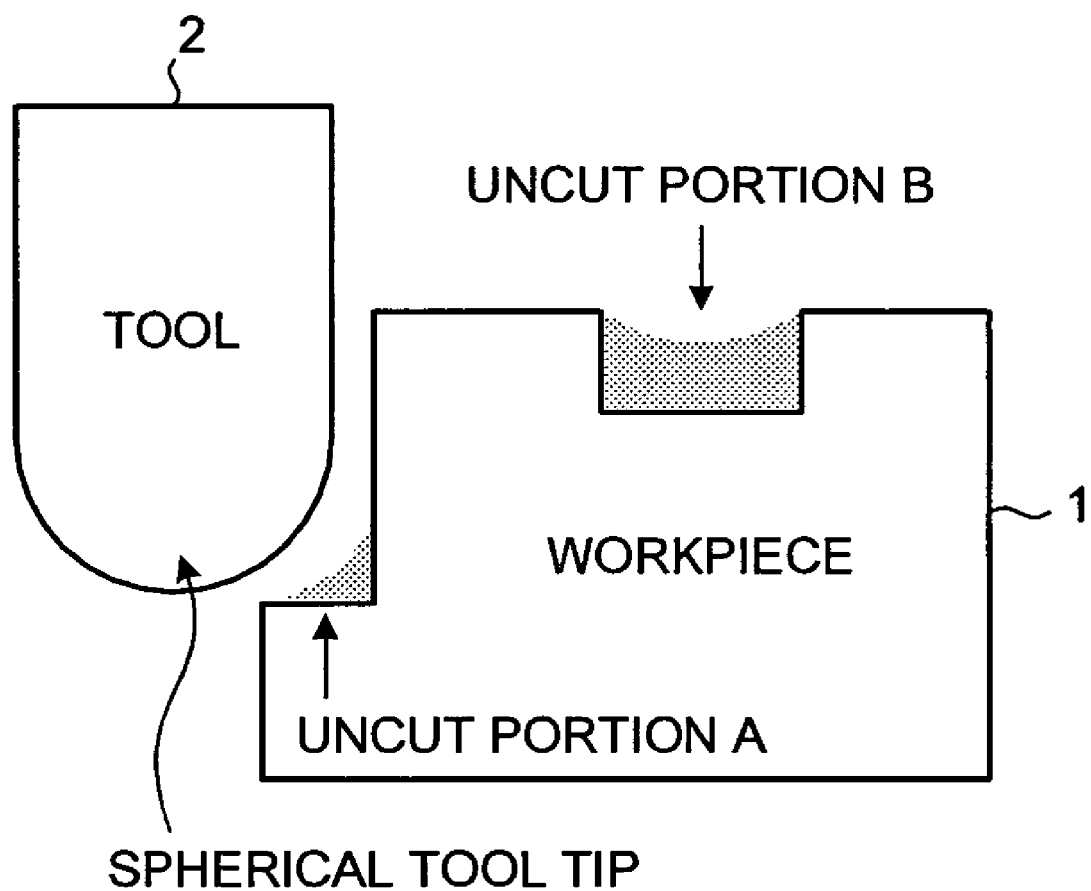
FIG. 8 is a diagram for explaining a classification of a cross-sectional shape of a workpiece according to the embodiment.

FIG. 8 is a diagram for explaining a classification of a cross-sectional shape of a workpiece. A minimum number of cross-sectional shape types required for a creation of an equation model (mathematical model) are explained in detail below.

@: Classification of Machining Profiles a: Explanation of Workpiece Shapes

Cross-sectional patterns of uncut portions fall into two broad types (such as patterns of an uncut portion A and an uncut portion B in FIG. 8). One type is a pattern of an uncut portion such as the uncut portion A in FIG. 8. This uncut portion is left in a possible L shape, with a profile made along a tool tip shape. The other type is a pattern of an uncut portion such as the uncut portion B in FIG. B. If a tool has a diameter smaller than the width of a possible groove shape, an uncut portion is left with a profile made along the tip shape of the tool as in the case of the uncut portion A; and if the tool diameter is larger than the width of the groove, the uncut portion B is left as shown in the FIG. 8.

b: Explanation of Tool Tip Shapes

Figure 9A:
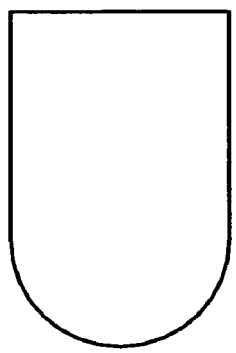
FIG. 9A to FIG. 9D are diagrams for explaining a classification of a cross-sectional shape of a tool tip according to the embodiment.
Figure 9B:
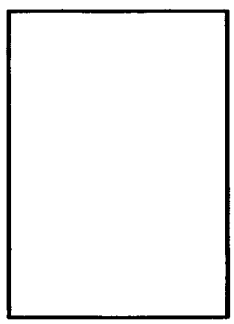
Figure 9C:
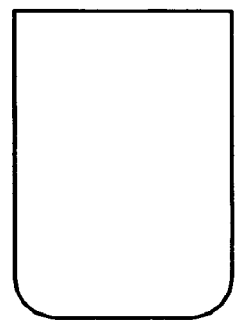
Figure 9D:
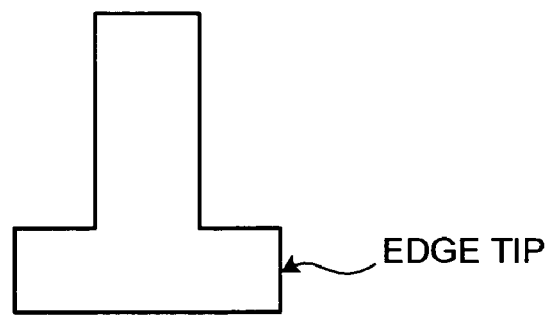

FIG. 9A to FIG. 9D are diagrams for explaining a classification of a cross-sectional shape of a tool tip. FIG. 9A is a schematic of a ball end mill. FIG. 9B is a schematic of a flat end mill. FIG. 9C is a schematic of an R end mill. FIG. 9D is a schematic of a special shape mill. Although there are no limits to tool tip shapes including special types (such as one shown in FIG. 9D), the ball end mill as shown in FIG. 9A, the flat end mill as shown in FIG. 9B, and the R end mill as shown in FIG. 9C are typically used. According to the present invention, the cross-sectional shapes of the three types of tool tips are explained below.

c: Further Explanation of Cross-Sectional Shapes

Figure 10A:
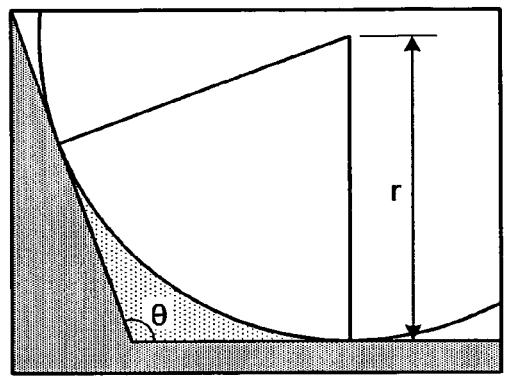
FIG. 10A to FIG. 10C are diagrams for further explaining cross-sectional shapes according to the embodiment.
Figure 10B:
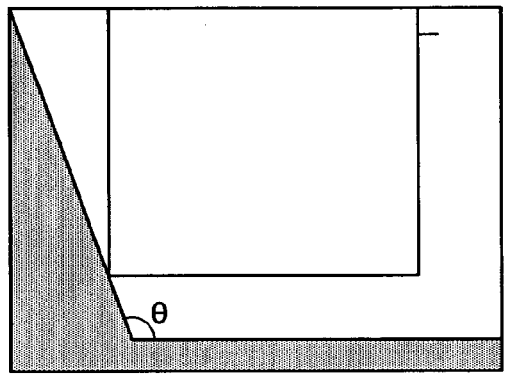
Figure 10C:
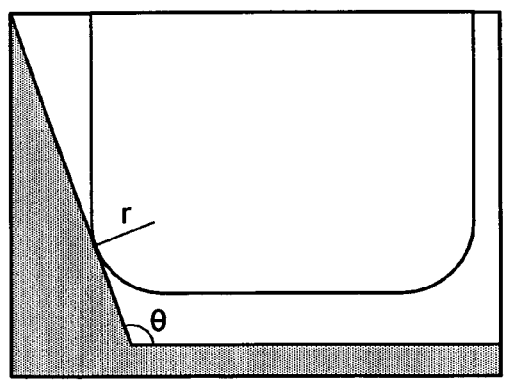

FIG. 10A to FIG. 10C are diagrams for further explaining cross-sectional shapes. FIG. 11A to FIG. 11D are other diagrams for further explaining the cross-sectional shapes. In FIG. 10A to FIG. 10C, r indicates a tool tip radius, while θ indicates a wall angle.

An uncut portion may be left, depending on a tool tip shape. For example, when a wall angle is $\pi/2 \leq \theta < \pi$, a cross-sectional shape is as follows.

With the ball end mill (see FIG. 9A), an uncut portion is left as shown in FIG. 10A. With the flat end mill (see FIG. 9B), no uncut portion is left theoretically as shown in FIG. 10B. With the R end mill (see FIG. 9C), an uncut portion is left as shown in FIG. 10C. This uncut portion has the same cross-sectional area as that resulting from the use of the ball end mill.

Figure 11A:
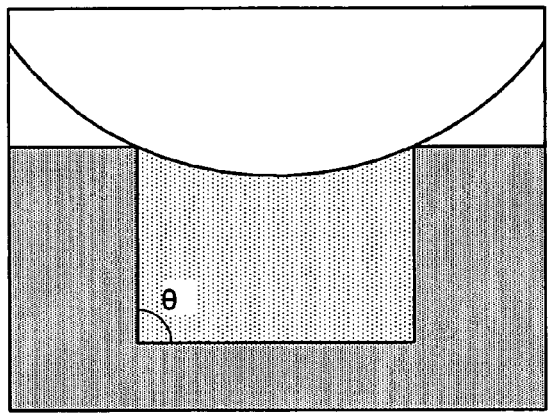
FIG. 11A to FIG. 11D are other diagrams for further explaining the cross-sectional shapes according to the embodiment.

If the width of a possible groove shape is smaller than the diameter of a tool, a still larger uncut portion is left because the tool cannot be inserted completely, as shown in FIG. 11A. When a groove wall angle is $\pi/2 \leq \theta < \pi$, a cross-sectional shape is as follows.

Figure 11B:
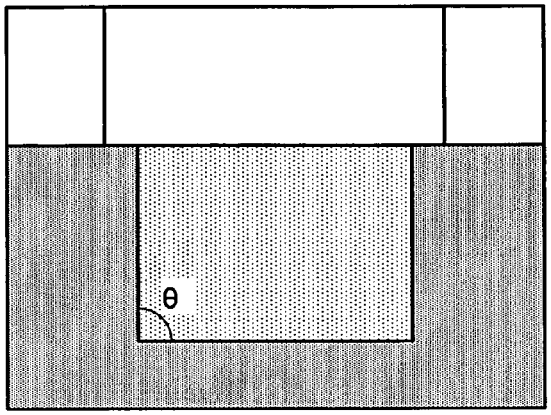
Figure 11C:
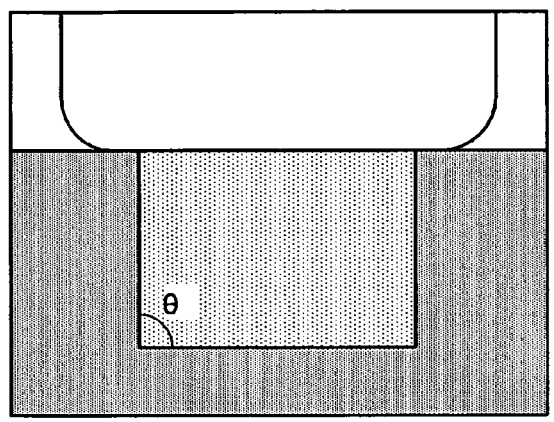
Figure 11D:
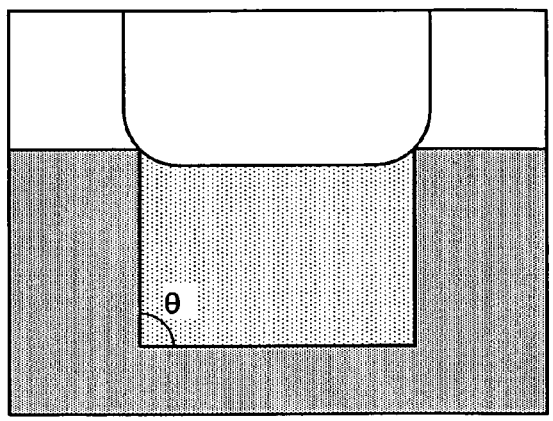

With the ball end mill (see FIG. 9A), a cross section of a workpiece to which the tool tip is only slightly inserted is obtained as shown in FIG. 11A. With the flat end mill (see FIG. 9B), a cross section of a workpiece to which the tool tip is not inserted at all is obtained as shown in FIG. 11B. With the R end mill (see FIG. 9C), two types of cross sections are possible; a cross section of a workpiece to which the tool tip is not inserted at all is obtained as shown in FIG. 11C, or a cross section of a workpiece to which the tool tip is only slightly inserted is obtained as shown in FIG. 11D.

§5: Explanation of a Machining Information Generating Apparatus Configuration

Figure 12:
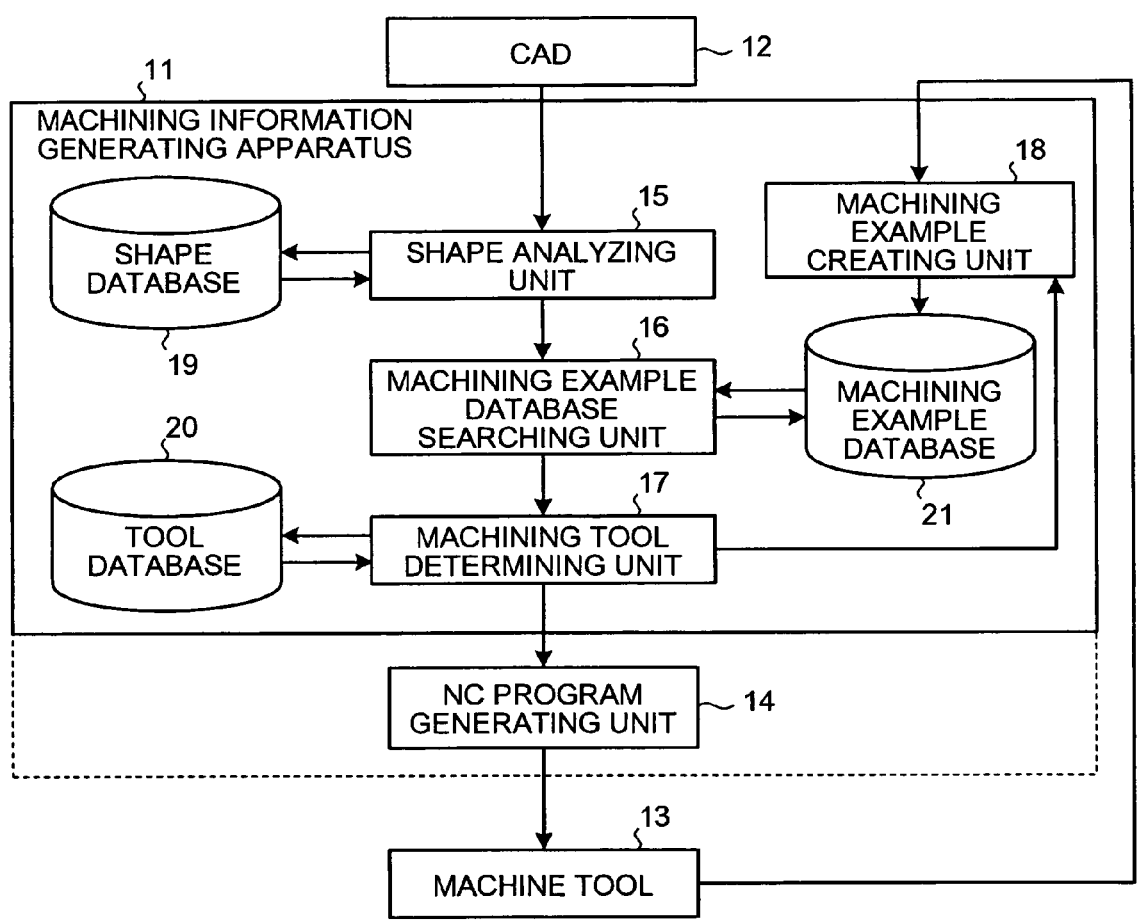
FIG. 12 is a block diagram of a machining information generating apparatus according to the embodiment.

FIG. 12 is a block diagram of the machining information generating apparatus. As shown in FIG. 12, a machining information generating apparatus 11 includes a shape analyzing unit 15, a machining example database searching unit 16, a machining tool determining unit 17, a machining example creating unit 18, a shape database 19, a tool database 20, and a machining example database 21.

In this configuration, the machining information generating apparatus 11, which is connected to a CAD 12, receives CAD data from the CAD 12 to generate machining information, and sends the generated machining information (machining data) to a machine tool 13 via an NC program generating unit 14 (CAM). Machining example information acquired by a sensor etc. of the machine tool 13 is transferred to the machining example creating unit 18, which then stores the information sequentially in the machining example database 21.

The shape analyzing unit 15 obtains CAD data about a workpiece from the CAD 12, and performs a shape analysis on the workpiece based on the CAD data. During the shape analysis, the shape analyzing unit 15 uses information resulting from a search in the shape database 19.

The machining example database searching unit 16 obtains the shape analysis results (including CAD data and shape data) from the shape analyzing unit 15, and searches the machining example database 21 for necessary information. The machining tool determining unit 17 obtains information (CAD data, shape data, and machining examples) from the machining example database searching unit 16, searches the tool database 20 for tools most relevant to the information, determines optimum tools for machining, and outputs machining information (including parameters for generating NC programs).

The machining example creating unit 18 obtains information (including CAD data, shape data, machining examples, and parameters for generating NC programs) from the machining tool determining unit 17, equations from the shape analyzing unit 15, applicable tools from the machining tool determining unit 17, machining conditions etc. from the NC program generating unit 14 (CAM), and machining information from the machine tool 13, to output a machining example for storage in the machining example database 21. The NC program generating unit 14 (CAM) generates NC programs based on the machining information determined by the machining tool determining unit 17, and supplies the programs to the machine tool 13.

As explained above, the machining information generating apparatus 11 generates machining information for a determination of a necessary tool etc. when a tool path for machining is created in the CAM by using CAD workpiece data generated in the CAD 12. The shape database 19 contains previously entered machining profile information. The tool database 20 contains previously entered tool information. The machining example database 21 sequentially stores information generated for machining, as machining examples. The shape analyzing unit 15 obtains CAD data generated in the CAD 12, searches the shape database 19 for necessary information based on the obtained data, and performs a shape analysis, thereby creating an equation model for an uncut amount along an intended machining profile based on an uncut amount resulting from a simulation of a tool and data about the machining profile. The machining example database searching unit 16 searches the machining example database 21 for a machining example in which an equation degree most closely approximates a degree of an equation for the analysis result from the shape analyzing unit 15. The machining tool determining unit 17 obtains the machining examples found by the machining example database searching unit 16, searches the tool database 20 for a tool most relevant to tool information about the machining examples, determines a tool for use in a basic machining process by comparing values from the equations with estimated values of simulated uncut amounts, and outputs machining information in which a process for machining uncut portions is added to complement the basic machining process. The machining example creating unit 18 obtains the machining information from the machine tool 13, the equations from the shape analyzing unit 15, the information about machining and applicable tools (including CAD data, shape data, machining examples, and parameters for generating NC programs) from the machining tool determining unit 17 to output a machining example for storage in the machining example database 21. The NC program generating unit 14 may be provided inside the machining information generating apparatus 11.

The shape analyzing unit 15, the machining example database searching unit 16, the machining tool determining unit 17, and the machining example creating unit 18 include programs, which are executed by a central processing unit (CPU) (not shown) in the machining information generating apparatus to implement the functions of the units. The NC program generating unit 14 also includes a program, which is executed by the CPU (not shown) in the machining information generating apparatus or a CPU (not shown) in the CAM to implement the function of the unit.

Figure 13:
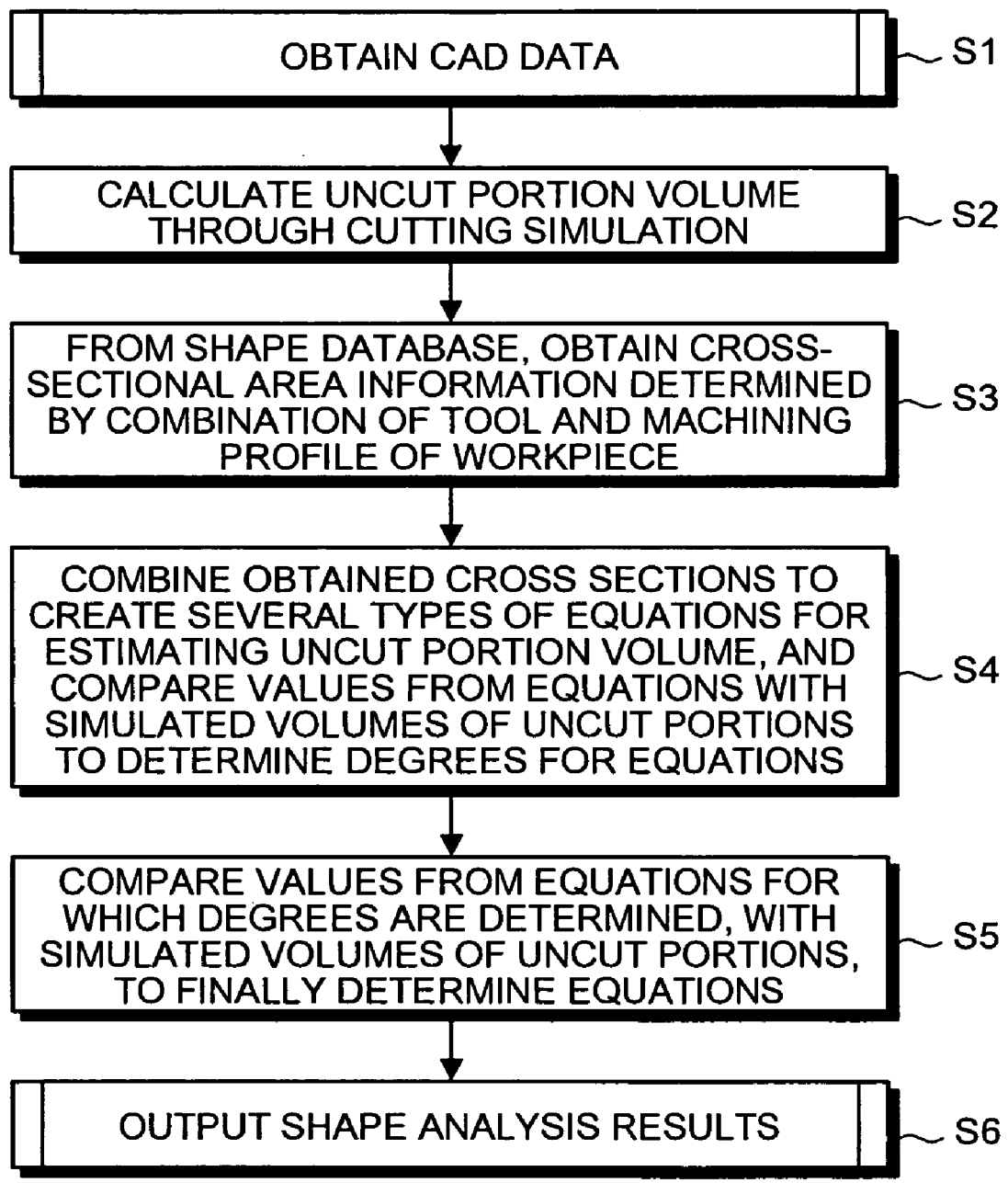
FIG. 13 is a flowchart of processing in the shape analyzing unit according to the embodiment.

§6: Detailed Explanation of Processing in the Units in the Machining Information Generating Apparatus and Sample Databases (1): Explanation of Processing in the Shape Analyzing Unit FIG. 13 is a flowchart of processing in the shape analyzing unit. The processing in the shape analyzing unit is explained below with reference to FIG. 13. In FIG. 13, S1 to S6 indicate processing steps.

The shape analyzing unit 15 obtains CAD workpiece data from the CAD 12 (S1), and calculates an uncut portion volume through a cutting simulation (S2). From the shape database 19, the shape analyzing unit 15 obtains cross-sectional area information determined by a combination of a tool and a machining profile of the workpiece (S3). The shape analyzing unit 15 combines the obtained cross sections to create several types of equations for estimating the uncut portion volume, and compares values from the equations with the simulated volumes of uncut portions to determine the degrees for the equations (S4). The shape analyzing unit 15 compares values from the equations for which the degrees are determined, with the simulated volumes of uncut portions, to finally determine the equations (S5). The shape analyzing unit 15 outputs shape analysis results (S6), completing the processing.

(2): Explanation of Processing in the Machining Example Database Searching Unit

Figure 14:
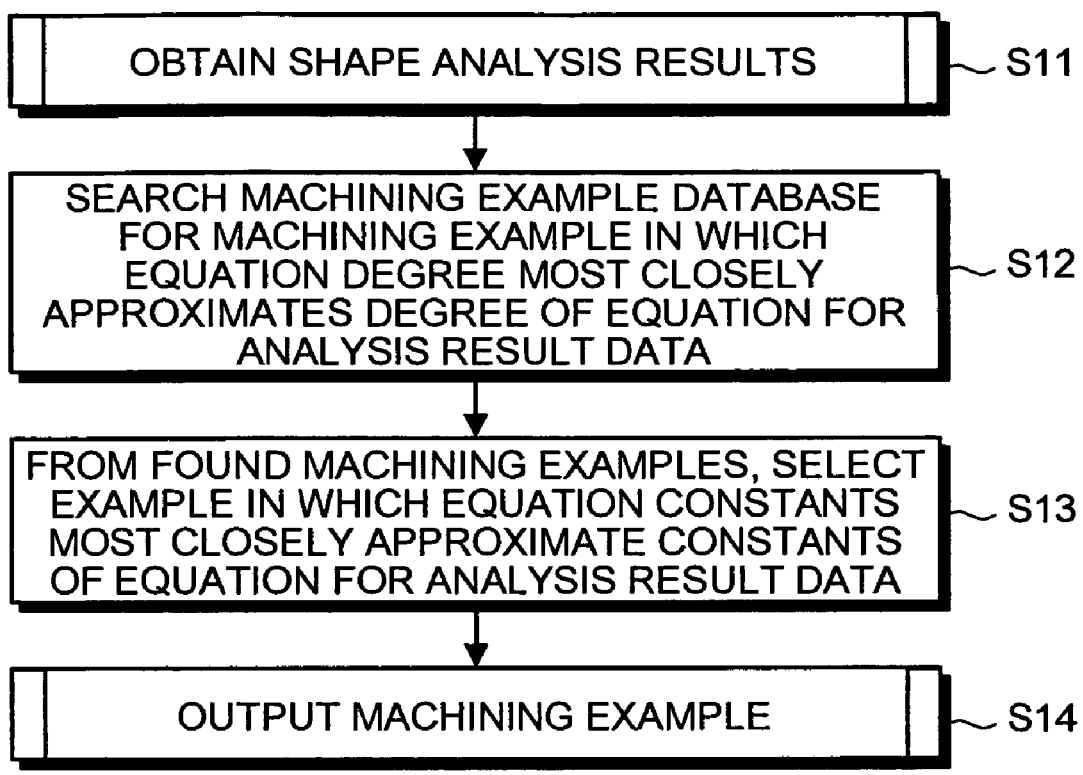
FIG. 14 is a flowchart of processing in the machining example database searching unit according to the embodiment.

FIG. 14 is a flowchart of processing in the machining example database searching unit. The processing in the machining example database searching unit is explained below with reference to FIG. 14. In FIG. 14, S11 to S14 indicate processing steps.

The machining example database searching unit 16 obtains the shape analysis results from the shape analyzing unit 15 (S11), and searches the machining example database 21 for a machining example in which an equation degree most closely approximates a degree of an equation for the analysis result data (S12). From the found machining examples, the machining example database searching unit 16 selects an example in which equation constants most closely approximate constants of an equation for the analysis result data (S13). The machining example database searching unit 16 outputs a machining example to the machining tool determining unit 17 (S14), completing the processing.

(3): Explanation of Processing in the Machining Tool Determining Unit

Figure 15:
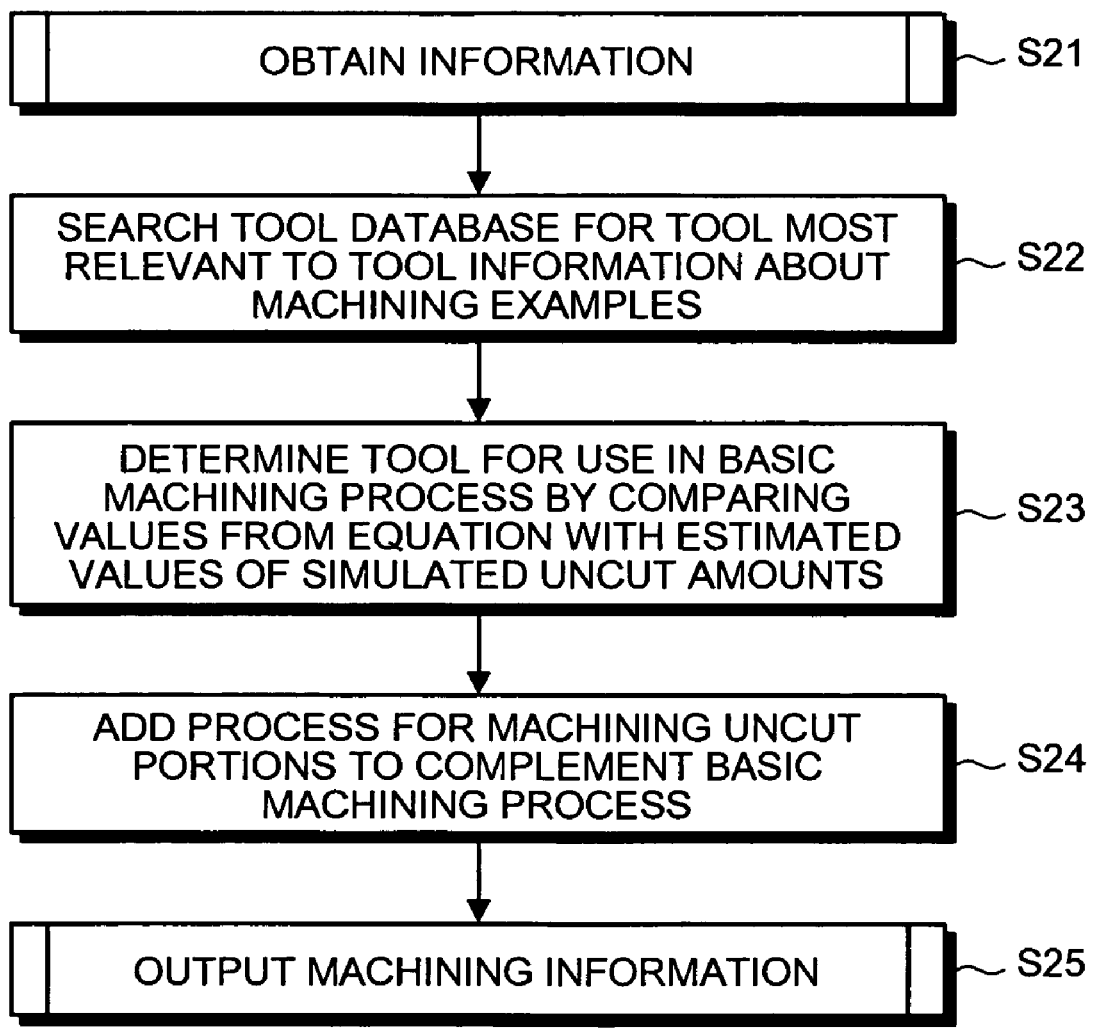
FIG. 15 is a flowchart of processing in the machining tool determining unit according to the embodiment.

FIG. 15 is a flowchart of processing in the machining tool determining unit. The processing in the machining tool determining unit is explained below with reference to FIG. 15. In FIG. 15, S21 to S25 indicate processing steps.

The machining tool determining unit 17 obtains the information (CAD data, shape data, and machining examples) from the machining example database searching unit 16 (S21), and searches the tool database 20 for a tool most relevant to tool information about the machining examples (S22). The machining tool determining unit 17 determines a tool for use in a basic machining process by comparing values from the equation with estimated values of simulated uncut amounts (S23).

The machining tool determining unit 17 adds a process for machining uncut portions to complement the basic machining process (S24). The machining tool determining unit 17 outputs machining information (parameters for generating NC programs) to the NC program generating unit (S25), completing the processing.

(4): Explanation of Processing in the Machining Example Creating Unit

Figure 16:
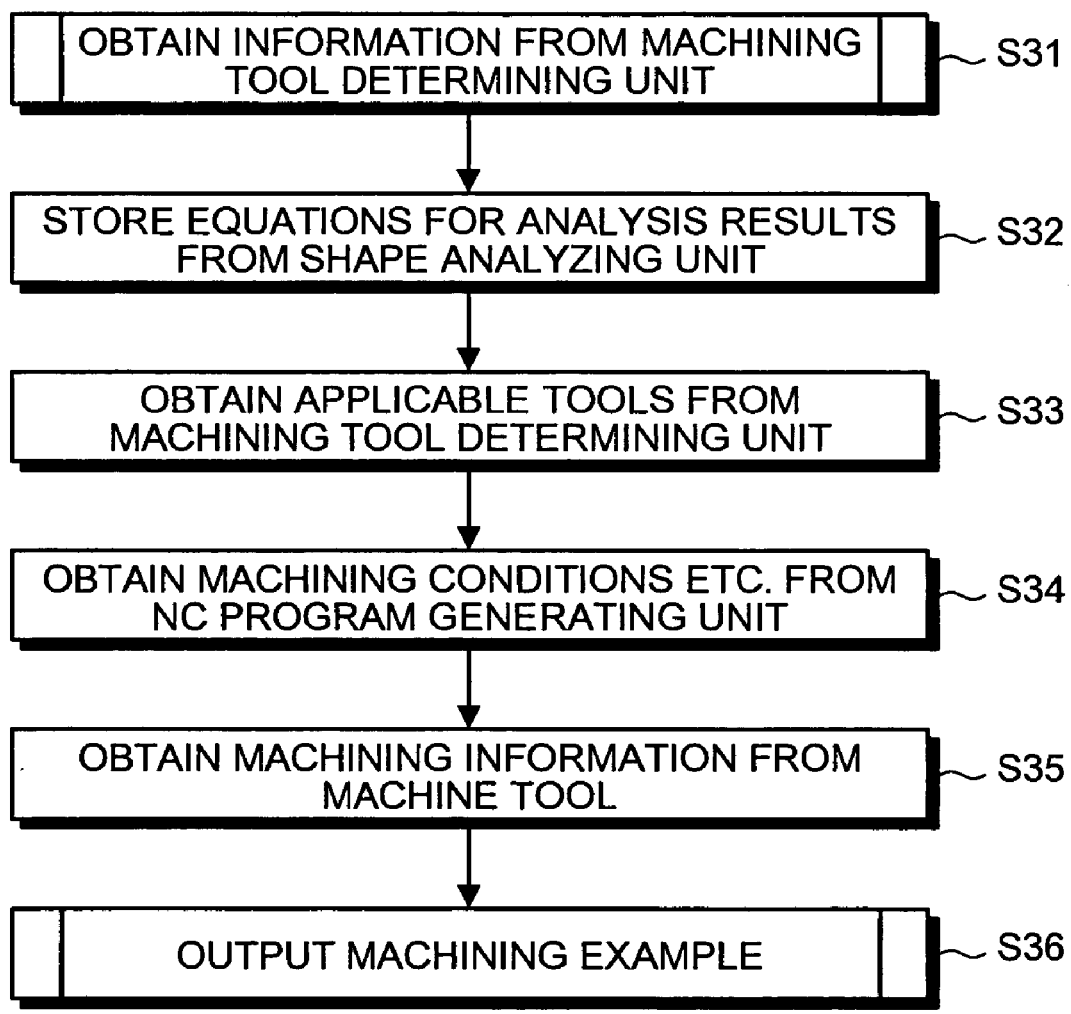
FIG. 16 is a flowchart of processing in the machining example creating unit according to the embodiment.

FIG. 16 is a flowchart of processing in the machining example creating unit. The processing in the machining example creating unit is explained below with reference to FIG. 16. In FIG. 16, S31 to S36 indicate processing steps.

The machining example creating unit 18 obtains the information (including CAD data, shape data, machining examples, and parameters for generating NC programs) from the machining tool determining unit 17 (S31), stores the equations for the analysis results from the shape analyzing unit 15 (S32), obtains the applicable tools (from the parameters for generating NC programs) from the machining tool determining unit 17 (S33), and obtains the data including machining conditions from the NC program generating unit 14 (S34).

The machining example creating unit 18 obtains machining information (acquired by the sensor etc.) from the machine tool 13 (S35). The machining example creating unit 18 outputs a machining example (S36) for storage in the machining example database 21, completing the processing.

(5): Sample Shape Database

FIG. 17 is a schematic for illustrating a sample shape database. For example, the shape database 19 is configured as shown in FIG. 17. The shape database 19 contains a listing of shape IDs (identification codes related to shapes) 1, 2, 3, 4, 5, 6, and so forth, for each of which a cross-sectional shape name and an equation (equation model) are registered.

For a shape ID of 1, the name is "cross-sectional shape A" and the equation is $0.215 \times a1 \times r^2$. For a shape ID of 2, the name is "cross-sectional shape B" and the equation is $0.19 \times a1 \times r^2$. For a shape ID of 3, the name is "cross-sectional shape C" and the equation is $0.18 \times a1 \times r^2$ (where * means ×).

Similarly, subsequent entries are registered. The shape database 19 contains data or information previously entered manually.

(6): Sample Machining Example Database

FIG. 18 is a schematic for illustrating a sample machining example database. For example, the machining example database 21 is configured as shown in FIG. 18. The machining example database 21 contains a listing of machining example IDs (identification codes related to machining examples) 1, 2, 3, 4, 5, 6, and so forth, for each of which a mold name, an equation (equation model), applicable tools, a machining time are registered.

For a machining example ID of 1, the name is "mold A," the equation is $120 \times r2 + 200 \times r + 50$, the applicable tools are 1, 3, and 5, and the machining time is 1200. For a machining example ID of 2, the name is "mold B," the equation is $300 \times r2 + 30$, the applicable tools are 1, 2, and 3, and the machining time is 400. For a machining example ID of 1, the name is "mold C," the equation is $1400 \times r2 + 4000 \times r + 50$, the applicable tools are 3, 5, and 8, and the machining time is 11500. Similarly, subsequent entries are registered.

(7): Sample Tool Database

FIG. 19 is a schematic for illustrating a sample tool database. For example, the tool database 20 is configured as shown in FIG. 19. The tool database 20 contains a listing of tool IDs (identification codes related to tools) 1, 2, 3, 4, 5, 6, and so forth, for each of which a name, a tool diameter, a cutting edge length, a total length, and a handle diameter are registered.

For a tool ID of 1, the name is "BEM1," the tool diameter is 1, the cutting edge length is 10, the total length is 50, and the handle diameter is 4. For a tool ID of 2, the name is "BEM2," the tool diameter is 2, the cutting edge length is 10, the total length is 50, and the handle diameter is 4. For a tool ID of 3, the name is "BEM3," the tool diameter is 3, the cutting edge length is 20, the total length is 60, and the handle diameter is 4. Similarly, subsequent entries are registered. The tool database 20 contains data or information previously entered manually.

§7: Explanation of an Instance of the Apparatus and a Recording Medium

Figure 20:
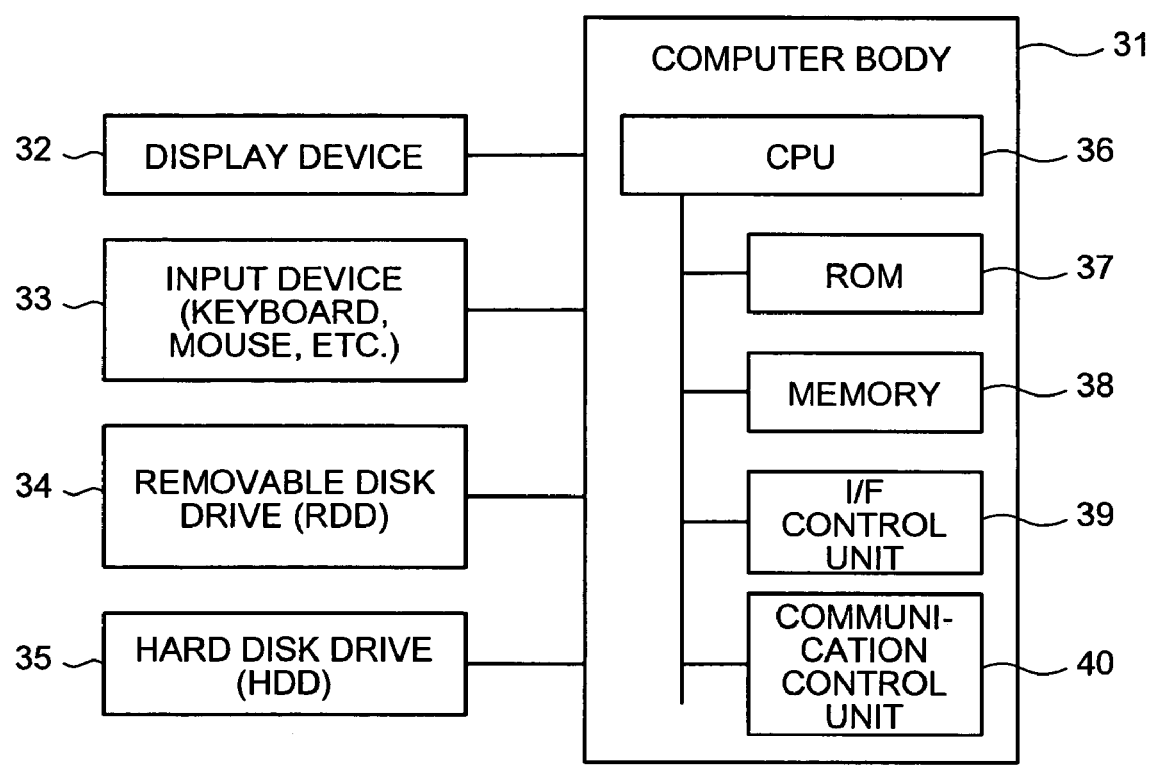
FIG. 20 is a block diagram of one instance of the apparatus according to the embodiment.

FIG. 20 is a block diagram of one instance of the machining information generating apparatus shown in FIG. 12. Any computer such as a personal computer or a workstation may be used to provide the machining information generating apparatus, which includes a computer body 31, and also includes a display device 32, an input device 33 such as a keyboard or a mouse, a removable disk drive (RDD) 34 such as a floppy disk drive (FDD), a compact disc-read-only memory (CD-ROM) drive, or an optical disk drive, and a hard disk drive (HDD) 35, all of which are connected to the computer body 31.

The computer body 31 includes a central processing unit (CPU) 36 that performs various control operations etc., a read-only memory (ROM) 37 (nonvolatile memory) that stores data such as programs and parameters, a memory 38 used by the CPU 36 as working memory, an interface control unit (I/F control unit) 39 that controls an interface with an external I/O device, and a communication control unit 40 that controls a communication with an external device.

The shape analyzing unit 15, the machining example database searching unit 16, the machining tool determining unit 17, the machining example creating unit 18, and the NC program generating unit 14 include programs. The programs are prestored in a hard disk (recording medium) in the hard disk drive (HDD) 35 or the ROM 37, and read under control of the CPU 36. The CPU 36 then executes the programs to perform the processing (machining information generating processing) in the units.

However, the present invention is not limited to such an instance. For example, programs may be stored in a hard disk in the hard disk drive (HDD) 35 as explained below before they can be executed by the CPU 36 to perform the machining information generating processing.

1): Read programs stored in a removal disk (such as a CD-ROM or any other optical disk) prepared in another apparatus (read program data generated in another apparatus) from the removable disk drive (RDD) 34. Then, store the programs in a recording medium (hard disk) in the hard disk drive (HDD) 35.

2): Receive, via the communication control unit 40, data including programs transmitted over a communication network such as a LAN, from another apparatus. Then, store the data in the recording medium (hard disk) in the hard disk drive (HDD) 35.

According to the embodiments, the shape analyzing unit or the shape analyzing step obtains CAD-generated data, searches the shape database for necessary information based on the data, and performs a shape analysis, thereby creating an equation model for an uncut amount along an intended machining profile based on an uncut amount result from a simulation of a tool and data about the machining profile.

Based on the uncut amount result from the simulation of the tool and the data about the machining profile of an intended workpiece, the equation model for the uncut amount along the machining profile is thus created to convert shape characteristics into numeric values, thereby enabling an assistance to be provided easily in a machining database construction or a tool selection.

Moreover, the optimum tool selecting unit or the optimum tool selecting step selects, based on the equation model for the uncut amount along the machining profile, an optimum tool by comparing characteristics of the equation model with an uncut amount result estimated from the equation model. This enables a further assistance to be provided easily in a tool selection.

Furthermore, the database constructing unit or the database constructing step constructs, based on the equation model for the uncut amount along the machining profile, a database in which a degree and constants of the equation model are handled as shape characteristics for machining. This enables a further assistance to be provided easily in a database construction.

Moreover, the machining example database searching unit or the machining example database searching step searches the machining example database for a machining example in which an equation degree most closely approximates a degrees of an equation for an analysis result from the shape analyzing unit or the shape analyzing step. This enables searches to be made for past similar examples.

Furthermore, the machining tool determining unit or the machining tool determining step obtains the machining examples found by the machining example database searching unit or the machining example database searching step, searches the tool database for a tool most relevant to tool information about the machining examples, determines a tool for use in a basic machining process by comparing values from the equation with estimated values of simulated uncut amounts, and outputs machining information in which a process for machining uncut portions is added to complement the basic machining process. This enables optimum tools to be selected.

Moreover, the machining example creating unit or the machining example creating step obtains machining information from the machine tool, the equation from the shape analyzing unit or the shape analyzing step, and the information about machining and applicable tools (CAD data and parameters for generating NC programs) from the machining tool determining unit or the machining tool determining step to create a machining example, which is then output for storage in the machining example database. This enables machining examples to be stored in the machining example database.

Based on the uncut amount result from the simulation of the tool and the data about the machining profile of an intended workpiece, the equation model for the uncut amount along the machining profile is thus created to convert shape characteristics into numerical values, thereby enabling an assistance to be provided in a machining database construction or a tool selection.

For a given workpiece, absolute evaluation criteria that do not include shapes or product names can be provided. When a system is constructed based on the evaluation criteria, a computer-based assistance can be provided easily in a tool selection or a categorization of workpieces by machining characteristics, without having to cause a computer to perform a vast quantity of calculations.

According to the embodiments, based on an uncut amount result from a simulation of a tool and data (including CAD data) about a machining profile of an intended workpiece, an equation model for an uncut amount along the machining profile is created to convert shape characteristics into numerical values, thereby enabling an assistance to be provided easily in a machining database construction or a tool selection.

Moreover, a further assistance can be provided easily in a tool selection.

Furthermore, a further assistance can be provided easily in a database construction.

Moreover, searches can be made for past similar examples.

Furthermore, optimum tools can be selected.

Moreover, machining examples can be stored in a machining example database.

For a given workpiece, absolute evaluation criteria that do not include shapes or product names can be provided. When a system is constructed based on the evaluation criteria, a computer-based assistance can be provided easily in a tool selection or a categorization of workpieces by machining characteristics, without having to cause a computer to perform a vast quantity of calculations.

Furthermore, one effect of the present invention is that, based on the uncut amount result from the simulation of the tool and the data about the machining profile of an intended workpiece, the equation model for the uncut amount along the machining profile can be created to convert shape characteristics into numerical values, thereby enabling an assistance to be provided in a machining database construction or a tool selection.

Another effect is that, for a given workpiece, absolute evaluation criteria that do not include shapes or product names can be provided. Still another effect of the present invention is that, when a system is constructed based on the evaluation criteria, a computer-based assistance can be provided easily in a tool selection or a categorization of workpieces by machining characteristics, without having to cause a computer to perform a vast quantity of calculations.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A machining information generating apparatus for generating machining information for a determination of a necessary tool when a tool path for machining is created in a computer aided manufacturing (CAM) system from CAD data relating to workpiece generated in a computer aided design (CAD) system, comprising:
    a machining example database that stores information of machining examples including an equation model that takes into account an uncut amount and a tool used for machining for each machining example, wherein the equation model is handled as characteristics for machining;
    a tool database that stores information of tools;
    a shape analyzing unit that obtains the CAD data and creates an equation model taking into account a volume of an uncut amount based on the CAD data;
    a machining example database searching unit that searches the machining example database for a machining example in which the equation model most closely approximates the equation model created by the shape analyzing unit; and
    a machining tool determining unit that searches the tool database for a tool most relevant to the tool of the machining example searched by the machining example database searching unit, and generates the machining information.

2. The machining information generating apparatus according to claim 1, wherein the shape analyzing unit obtains the CAD data, searches a shape database of machining profile information for necessary information based on the CAD data, and performs a shape analysis, thereby creating the equation model that takes into account the uncut amount based on an uncut amount result from a simulation of a tool and data about the machining profile.

3. The machining information generating apparatus according to claim 2, wherein the shape analyzing unit obtains the CAD data, calculates an uncut portion volume through a cutting simulation, obtains cross-sectional area information determined by a combination of a tool and a machining profile of the workpiece from the shape database, combines the obtained cross sections to create several types of equations for estimating the uncut portion volume, and compares values from the equations with the simulated volume of the uncut portion to determine the equation model.

4. The machining information generating apparatus according to claim 1, further comprising a database constructing unit that constructs the machining example database based on an equation model that takes into account an uncut amount and a tool used for machining for each example.

5. The machining information generating apparatus according to claim 4, wherein the database constructing unit obtains machining information from a machine tool, an equation model from the shape analyzing unit, and information about machining and a tool from the machining tool determining unit to create a machining example.

6. The machining information generating apparatus according to claim 1, wherein the machining tool determining unit determines the tool as a basic machining process, and outputs machining information in which a process for machining an uncut portion is added to complement the basic machining process.

7. A computer-readable recording medium stores therein a computer program that causes a machining information generating apparatus to implement generating machining information for a determination of a necessary tool when a tool path for machining is created in a computer aided manufacturing (CAM) system from CAD data relating to workpiece generated in a computer aided design (CAD) system, the computer program causing a machining information generating apparatus to execute:

a shape analyzing procedure that obtains the CAD data and creates an equation model that takes into account a volume of an uncut amount based on the CAD data;

a machining example database searching procedure that searches a machining example database, which stores information of machining examples including an equation model taking into account an uncut amount and a tool used for machining for each machining example, wherein the equation model is handled as characteristics for machining, for a machining example in which the equation model most closely approximates the equation model created by the shape analyzing procedure; and a machining tool determining procedure that searches a tool database, which stores information of tools, for a tool most relevant to the tool of the machining example searched by the machining example database searching procedure, and generates the machining information.

8. The computer-readable recording medium according to claim 7, wherein the shape analyzing procedure obtains the CAD data, searches a shape database of machining profile information for necessary information based on the CAD data, and performs a shape analysis, thereby creating the equation model that takes into account the uncut amount based on an uncut amount result from a simulation of a tool and data about the machining profile.

9. The computer-readable recording medium according to claim 8, wherein the shape analyzing procedure obtains the CAD data, calculates an uncut portion volume through a cutting simulation, obtains cross-sectional area information determined by a combination of a tool and a machining profile of the workpiece from the shape database, combines the obtained cross sections to create several types of equations for estimating the uncut portion volume, and compares from the equations with the simulated volume of the uncut portion to determine the equation model.

10. The computer-readable recording medium according to claim 7, the computer program further causing a machining information generating apparatus to execute a database constructing procedure that constructs the machining example database, based on an equation model that takes into account an uncut amount and a tool used for machining for each machining example.

11. The computer-readable recording medium according to claim 10, wherein the database constructing procedure obtains machining information from a machine tool, an equation model created by the shape analyzing procedure, and information about machining and a tool determined by the machining tool determining procedure to create a machining example.

12. The computer-readable recording medium according to claim 7, wherein the machining tool determining procedure determines the tool as a basic machining process, and outputs machining information in which a process for machining an uncut portion is added to complement the basic machining process.

13. A machining information generating method for generating machining information for a determination of a necessary tool when a tool path for machining is created in a computer aided manufacturing (CAM) system from CAD data relating to workpiece generated in a computer aided design (CAD) system, comprising:

obtaining the CAD data and creating an equation model that takes into account a volume of an uncut amount based on the CAD data;

searching a machining example database, which stores information of machining examples including an equation model taking into account an uncut amount and a tool used for machining for each machining example, wherein the equation model is handled as characteristics for machining, for a machining example in which the equation model most closely approximates the equation model created by the creating of the equation model; and searching a tool database, which stores information of tools, for a tool most relevant to the tool of the machining example searched by the searching of the machining example database, and generating the matching information.

14. The machining information generating method according to claim 13, wherein the creating of the equation model obtains the CAD data, searches a shape database of matching profile information for necessary information based on the CAD data, and performs a shape analysis, thereby creating the equation model that takes into account the uncut amount based on an uncut amount result from a simulation of a tool and data about the machining profile.

15. The machining information generating method according to claim 14, wherein the creation of the equation model obtains the CAD data, calculates an uncut portion volume through a cutting simulation, obtains cross-sectional area information determined by a combination of a tool and a machining profile of the workpiece from the shape database, combines the obtained cross sections to create several types of equations for estimating the uncut portion volume, and compares values from the equations with the simulated volume of the uncut portion to determine the equation model.

16. The machining information generating method according to claim 13, further comprising constructing the machining example database, based on an equation model taking into account an uncut amount and a tool used for machining for each machining example.

17. The machining information generating method according to claim 16, wherein the construction of the machining example database further obtains machining information from a machine tool, an equation model, and information about machining and a tool determined by the determination to create a machining example.

18. The machining information generating method according to claim 13, wherein the determining determines the tool as a basic machining process, and outputs machining information in which a process for machining an uncut portion is added to complement the basic machining process.

19. A computer implemented method, comprising:

creating an equation model taking into account a volume of an uncut amount of a workpiece based on CAD data;

searching a machining example database storing machining examples and retrieving, based on the search, a machining example that most closely approximates the created equation model; and searching a tool database storing tool data and determining, based on the search, a tool that most closely matches the retrieved machining example.

20. The method of claim 19, wherein each machining example contains at least one of an identification code, a mold name, an equation, applicable tools and a machining time.

* * * * *